United States Patent
Sugiura

(10) Patent No.: US 9,528,602 B2
(45) Date of Patent: Dec. 27, 2016

(54) DOOR CONTROL SYSTEM WITH TRANSMISSION SHIFT RANGE CONTROL

(71) Applicant: DENSO CORPORATION, Kariya, Aichi-pref. (JP)

(72) Inventor: Hiroaki Sugiura, Anjo (JP)

(73) Assignee: DENSO CORPORATION, Kariya (JP)

(*) Notice: Subject to any disclaimer, the term of this patent is extended or adjusted under 35 U.S.C. 154(b) by 18 days.

(21) Appl. No.: 14/551,349

(22) Filed: Nov. 24, 2014

(65) Prior Publication Data
US 2015/0203127 A1   Jul. 23, 2015

(30) Foreign Application Priority Data
Jan. 21, 2014 (JP) .................................... 2014-8536

(51) Int. Cl.
*F16H 61/00* (2006.01)
*F16H 61/16* (2006.01)

(52) U.S. Cl.
CPC ..................... *F16H 61/16* (2013.01)

(58) Field of Classification Search
USPC .......................................... 701/48; 340/5.72
See application file for complete search history.

(56) References Cited

U.S. PATENT DOCUMENTS 6,594,565 B1 * 7/2003 Schafer et al. ................ 701/36

FOREIGN PATENT DOCUMENTS

| JP | 2007-231662 A | 9/2007 |
| JP | 2007-285421 A | 11/2007 |
| JP | 2010-149634 A | 7/2010 |

* cited by examiner

*Primary Examiner* — Adam Tissot
(74) *Attorney, Agent, or Firm* — Posz Law Group, PLC

(57) ABSTRACT

A door control system with transmission control includes a transmission control apparatus for controlling a shift-by-wire type transmission and a door control apparatus for controlling opening and closing of a door of a vehicle. The door control apparatus outputs a shift lock request to the transmission control apparatus when a door switch is manipulated to open. The door control apparatus checks whether a shift range signal is a non-drive range by setting a delay from the output of the shift lock request. When the shift range is the non-drive range, the door control apparatus opens the door. When the door switch is manipulated to close, the transmission control apparatus does not output the shift lock request and closes the door.

5 Claims, 15 Drawing Sheets

COMPARATIVE EMBODIMENT

COMPARATIVE EMBODIMENT

COMPARATIVE EMBODIMENT

COMPARATIVE EMBODIMENT

COMPARATIVE EMBODIMENT

COMPARATIVE EMBODIMENT

COMPARATIVE EMBODIMENT

FIG. 7 COMPARATIVE EMBODIMENT

FIG. 9   COMPARATIVE EMBODIMENT

FIG. 10 COMPARATIVE EMBODIMENT

DOOR CONTROL SYSTEM WITH TRANSMISSION SHIFT RANGE CONTROL

CROSS REFERENCE TO RELATED APPLICATION

This application is based on Japanese patent application No. 2014-8536 filed on Jan. 21, 2014, the disclosure of which is incorporated herein by reference.

FIELD

The present disclosure relates to a door control system with transmission shift range control, which controls opening/closing of a door while controlling a shift-by-wire type transmission.

BACKGROUND

Patent documents JP-A-2007-231662 and JP-A-2010-149634 disclose door control systems, which prevent a vehicle such as a bus from starting to move while a door is still open after passengers got off and on. For example, in a one-man bus having no conductors, it is regulated as safety standards to disable transfer of motive drive power until a door is closed. For this reason it is permitted in the one-man bus to open the door only when a transmission is in only a shift range, which corresponds to a neutral state (non-drive range, that is, N (neutral) range or a P (parking) range). In the one-man bus, a shift lever is mechanically fixed to hold the shift range in the neutral state as long as the door is open. Thus the motive drive power is prevented from being transferred while the door is open.

In a case that a transmission is a mechanical shift type, a shift lever of the transmission is mechanically fixed thereby to disable a user to perform range shifting, when a shift range is a non-drive range. However, in a case that the transmission is a shift-by-wire type, that is, an electronically-controlled type, a shift lever is a manipulation lever of a momentary type or a button, which is pressed down to switch over a shift range by electronic control. In this case, it is not possible to fix the shift range mechanically.

SUMMARY

It is therefore an object to provide a door control system with transmission shift range control, which can fix a shift range in a shift-by-wire transmission when a door is open with the shift range held in a non-drive range.

According to one aspect, a door control system with transmission shift range control comprises a shift range control apparatus for controlling a transmission of a shift-by-wire type and a door control apparatus for controlling opening/closing of a door of a vehicle.

The shift range control apparatus includes a drive range control part, a non-drive range control part and a signal output part. The drive range control part shifts a shift range of the transmission to a drive range and sets a shift range signal to indicate the drive range, when a manipulation for shifting the shift range of the transmission to the drive range is performed under a state that no shift lock request is outputted from the door control apparatus. The non-drive range control part shifts the shift range of the transmission to a non-drive range and sets the shift range signal to indicate the non-drive range, when a manipulation for shifting the shift range of the transmission to the non-drive range is performed. The signal output part outputs the shift range signal to the door control apparatus.

The door control apparatus includes a door opening part and a door closing part. The door opening part outputs the shift lock request to the shift range control apparatus when a door switch is manipulated to open, checks whether the shift range signal from the shift range control apparatus indicates the non-drive range after a delay from time of output of the shift lock request, and opens the door when the shift range signal indicates the non-drive range. The door closing part closes the door without outputting the shift lock request to the speed-change apparatus when the door switch is manipulated to close the door.

EMBODIMENT

Comparative Embodiment

Figure 1:
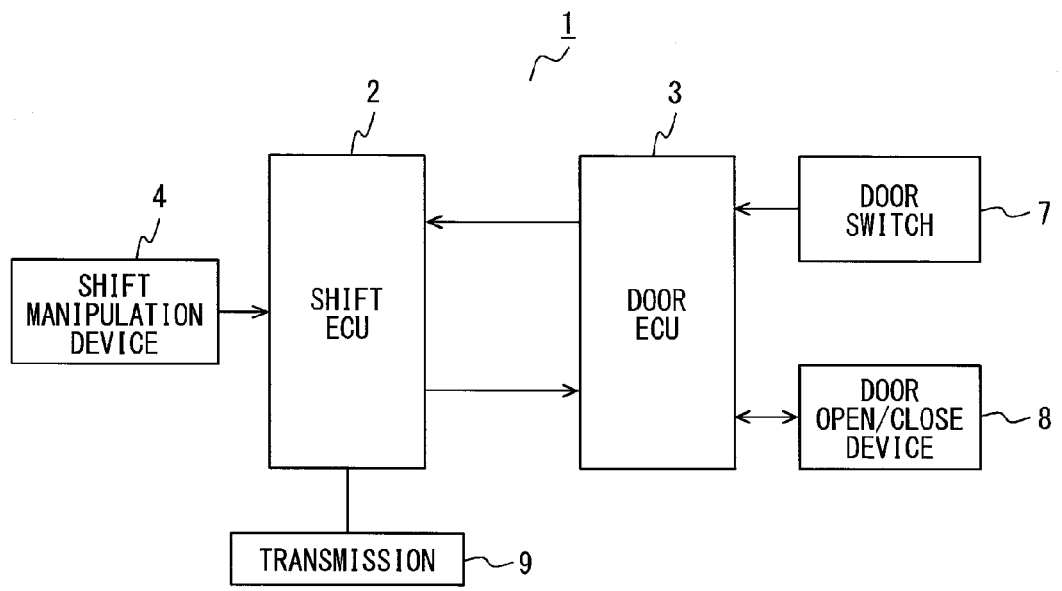
FIG. 1 is a block diagram of a door control system with transmission shift range control according to a comparative embodiment.

FIG. 1 to FIG. 10 show an exemplary door control system with transmission shift range control, which is under development, as a comparative embodiment. This system is configured to fix a shift range in a transmission of a shift-by-wire type when the shift range is in a non-drive range. A door control system 1 with transmission shift range control according to the comparative embodiment includes, as shown in FIG. 1, a shift ECU (electronic control unit, which is a transmission shift range control device) 2 and a door ECU (door control device) 3. The shift ECU 2 forms a shift range control apparatus. The door ECU 3 forms a door control apparatus.

The shift ECU 2 has a function of controlling a transmission 9 (not shown) of a shift-by-wire type (that is, electronically-controlled type) and functions as a drive range control part, a non-drive range control part, a signal output part. The shift ECU 2 receives a shift manipulation signal from a shift manipulation device 4, generates a range drive command signal for switching over a shift range of the transmission 9 based on the received shift manipulation signal, and outputs the generated range drive command signal to an actuator (not shown) for switching over the shift range of the transmission 9. The actuator switches over a range of the transmission 9 to the range, which is designated by the range drive command signal. The shift ECU 2 transmits a shift range signal, which indicates whether a present shift range of the transmission 9 is either a drive range or a non-drive range, to the door ECU 3. The shift ECU 2 receives a shift lock request signal transmitted from the door ECU 3.

The shift ECU 2 is so configured to hold or lock the shift range, which is a non-drive type range, when the present shift range of the transmission 9 is the non-drive type range, even when the shift manipulation signal for shifting the shift range of the transmission 9 is received from the shift manipulation device 4 at the time that the shift lock request signal is received (that is, the shift lock request signal is ON). The shift ECU 2 releases holding or locking of the shift range, when the shift lock request signal is not received from the door ECU 3 (that is, the shift lock request signal is OFF).

Figure 2A:
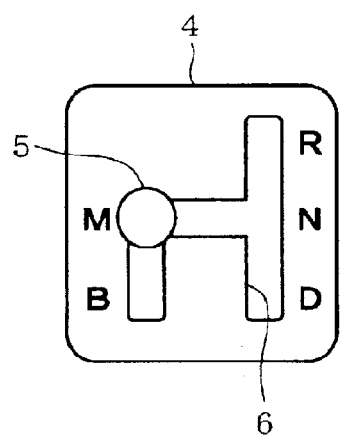
FIG. 2A and FIG. 2B are top views of a shift manipulation device in the comparative embodiment.
Figure 2B:
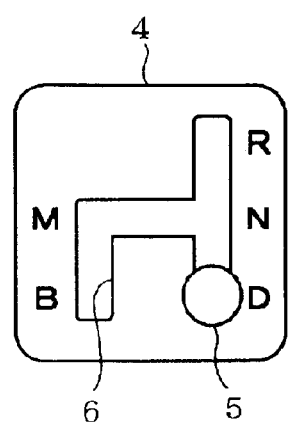

The shift manipulation device 4 has, as shown in FIG. 2A, a shift lever 5 of a momentary type and is configured to be capable of manually moving the shift lever 5 in a guide groove 6 by a driver of a vehicle. The shift lever 5 is normally located at a M position. When the range of the transmission 9 need be shifted to a D (drive) range, the shift lever 5 is moved to a D position as shown in FIG. 2B. The shift manipulation device 4 responsively outputs the shift manipulation signal, which indicates manipulation of the shift lever 5 to the D position, to the shift ECU 2. When manipulation of the shift lever 5 by the driver is stopped at the D position, the shift lever 5 returns to the M position. Similarly, when the range of the transmission 9 need be shifted to the N (neutral) range, B (brake) range and R (reverse) range, the shift lever 5 is moved to the N position, B position and R position, respectively. The shift manipulation device 4 responsively outputs shift manipulation signals, which indicate the movement of the shift lever 5 to the N position, B position and R position, to the shift ECU 2. When touching the shift lever 5 is stopped at the N position, B position or R position, the shift lever 5 returns to the M position.

The door ECU 3 has a function of controlling opening/closing of a door of a vehicle as well as functions of a door opening part and a door closing part. The door ECU 3 receives a door signal from a door switch 7 and outputs a door opening command signal or a door closing command signal to a door opening/closing device 8. The door switch 7 outputs a door signal of ON state to the door ECU 3 when a user (driver) turns it on under a state that the door signal is OFF. The door switch 7 changes the door signal to OFF (that is, outputs the door signal of OFF state to the door ECU 3) when the user turns it off under a state that the door signal is ON.

In response to the door opening command signal from the door ECU 3 under a state that the door is closed, the door opening/closing device 8 executes door opening processing (that is, processing for driving the actuator to open the door). In response to the door closing command signal from the door ECU 3 under a state that the door is open, the door opening/closing device 8 executes door closing processing (that is, processing for driving the actuator to close the door).

Figure 3:
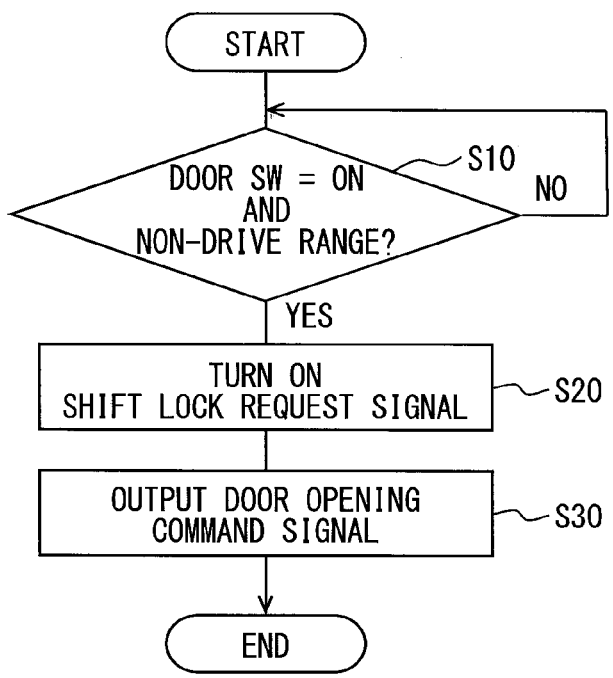
FIG. 3 is a flowchart of door opening control in the comparative embodiment.
Figure 4:
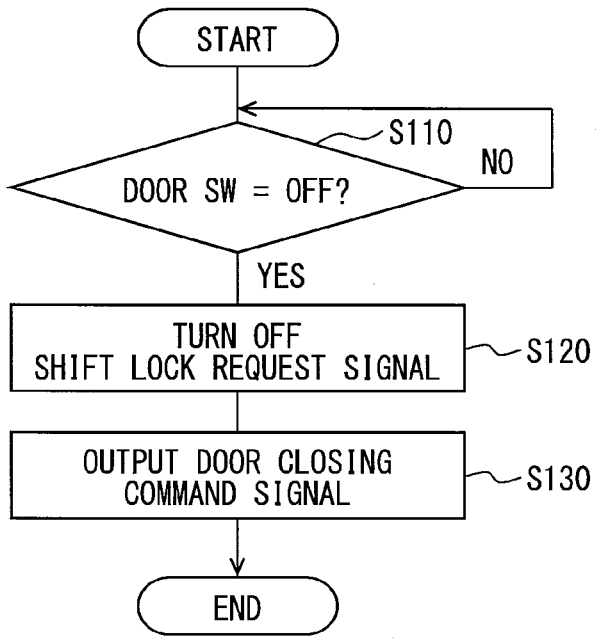
FIG. 4 is a flowchart of door closing control in the comparative embodiment.

Door opening/closing control of the door ECU 3 will be described next with reference to flowcharts shown in FIG. 3 and FIG. 4. The flowchart of FIG. 3 shows details of door opening control of the door ECU 3 and the flowchart of FIG. 4 shows details of door closing control of the ECU 3.

The door opening control will be described first. In this case, at step S10 of FIG. 3, it is checked whether the door signal (door SW) is ON (door opening operation) and the shift range of the transmission 9 is the non-drive range (N range or the like). When the door signal is OFF or the shift range of the transmission 9 is the drive range (D range or the like), step S10 outputs NO and repeats the same checking described above.

When the door signal is ON and the shift range of the transmission 9 is the non-drive range, step S10 outputs YES and step S20 is executed to turn on the shift lock request signal. Then at step S30, the door opening processing is executed. That is, the door ECU 3 outputs the door opening command signal to the door opening/closing device 8, which responsively opens the door.

The door closing control will be described next. In this case, at step S110 of FIG. 4, it is checked whether the door signal (door SW) is OFF. When the door signal is ON, step S110 outputs NO and repeats the same checking described above.

When the door signal is OFF, step S110 outputs YES and step S120 is executed to turn off the shift lock request signal. Then at step S130, the door closing processing is executed. That is, the door ECU 3 outputs the door closing command signal to the door opening/closing device 8, which responsively closes the door.

Figure 5:
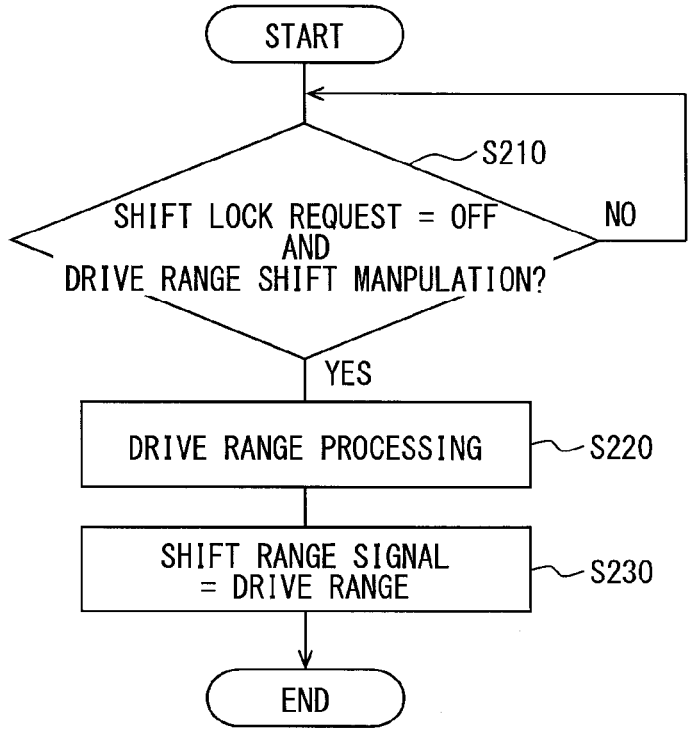
FIG. 5 is a flowchart of drive range control in the comparative embodiment.
Figure 6:
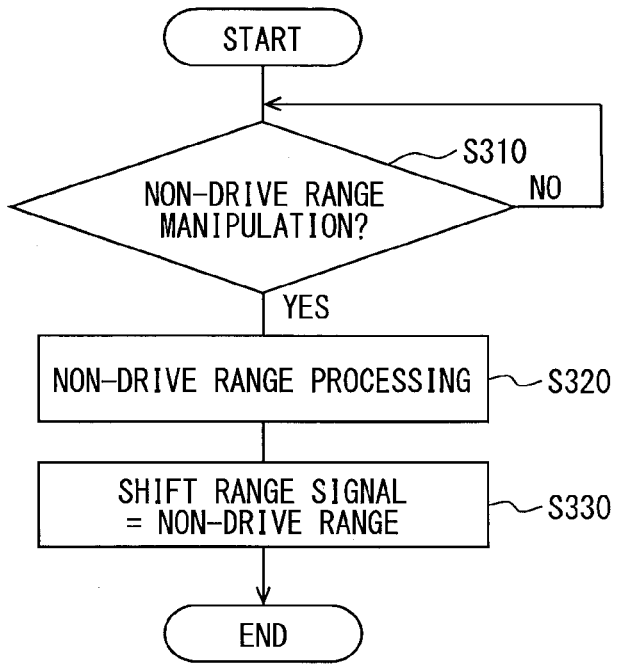
FIG. 6 is a flowchart of non-drive range control in the comparative embodiment.

The shift control of the shift ECU 2 will be described next with reference to flowcharts of FIG. 5 and FIG. 6. The flowchart of FIG. 5 shows details of control of drive range processing (control for switching over the shift range signal from the non-drive range to the drive range). The flowchart of FIG. 6 shows details of control of non-drive range processing (control for switching over the shift range signal from the drive range to the non-drive range).

The control of the drive range processing will be described first. In this case, at step S210 of FIG. 5, it is checked whether the shift lock request signal is OFF and the shift manipulation signal indicates a manipulation of shifting the shift range of the transmission 9 to the drive range (D range or the like). When the shift lock request signal is ON or the shift manipulation signal indicates the shifting manipulation of the shift range of the transmission 9 to the non-drive range (N range or the like), step S210 outputs NO and repeats the same checking described above.

When the shift lock request signal is OFF and the shift manipulation signal indicates the manipulation of shifting the shift range of the transmission 9 to the drive range (D range or the like), step S210 outputs YES and step S220 is executed. At step S220, the drive range processing is executed for shifting the shift range of the transmission 9 to the drive range (D range or the like) commanded based on the shift manipulation signal. Then, at step S230, the shift range signal is switched over from the state indicating the non-drive range to the state indicating the drive range.

The control of the non-drive range processing will be described next. In this case, at step S310 of FIG. 6, it is checked whether the shift manipulation signal indicates a manipulation of shifting the shift range of the transmission 9 to the non-drive range (N range or the like). When the shift manipulation signal indicates the shifting manipulation of the shift range of the transmission 9 to the drive range (D range or the like), step S310 outputs NO and repeats the same determination described above.

When the shift manipulation signal indicates the manipulation of shifting the shift range of the transmission 9 to the non-drive range (N range or the like), step S310 outputs YES and step S320 is executed. At step S320, the non-drive range processing is executed for shifting the shift range of the transmission 9 to the non-drive range (N range or the like) commanded based on the shift manipulation signal. Then, at step S330, the shift range signal is switched over from the state indicating the drive range to the state indicating the non-drive range.

By executing the control shown as flowcharts of FIG. 5 and FIG. 6, the shift ECU 2 prohibits the operation for shifting the transmission 9 to the drive range when the shift lock request signal is ON, and permits the operation for shifting the transmission 9 to the drive range only when the shift lock request signal is OFF.

Figure 7:
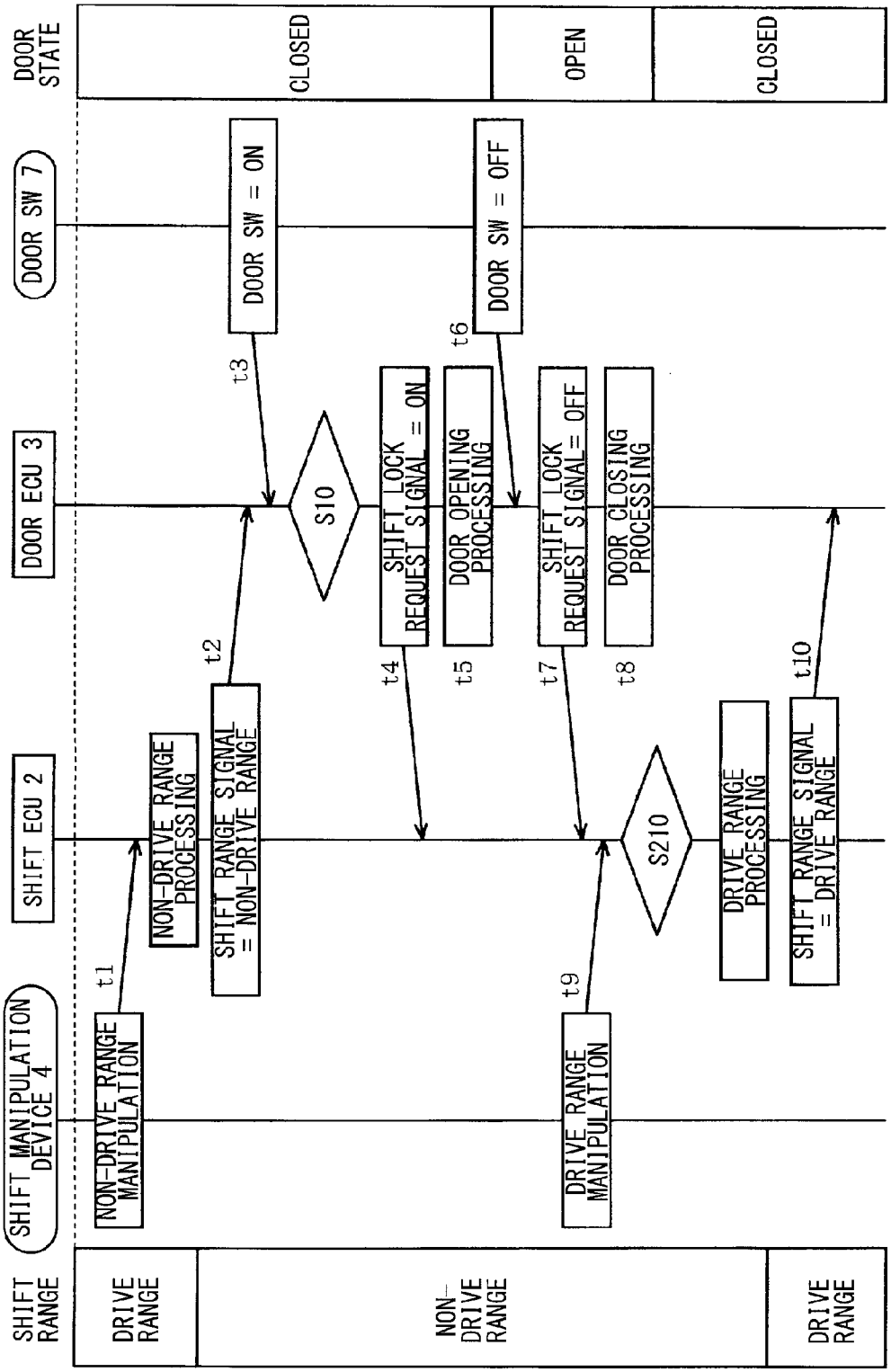
FIG. 7 is a sequence chart in the comparative embodiment.
Figure 8:
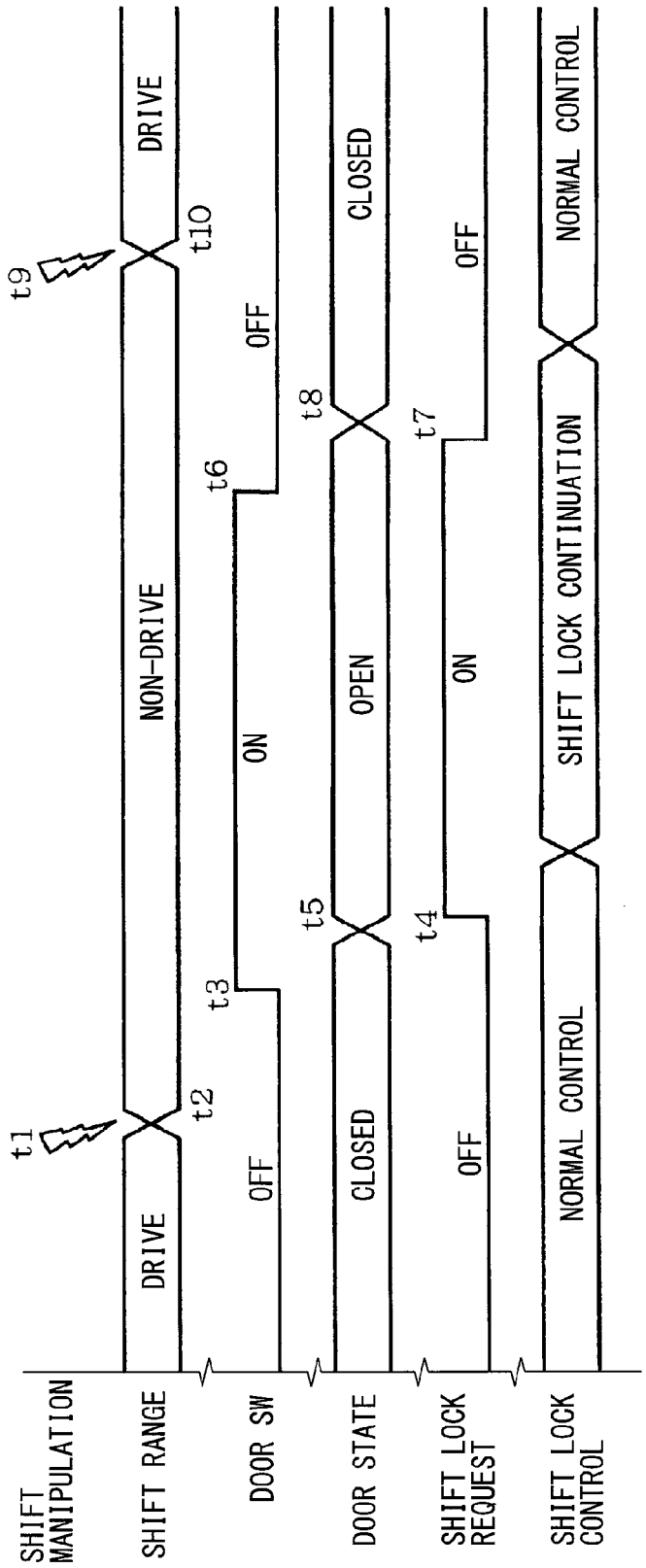
FIG. 8 is a time chart in the comparative embodiment.

A series of control among the state of the shift range of the transmission 9, the manipulation of the shift manipulation device 4, the control of the shift ECU 2, the control of the door ECU 3, the operation of the door switch 7 and the opening/closing state of the door is shown in a sequence chart of FIG. 7 and a time chart of FIG. 8. As shown in FIG. 7 and FIG. 8, when the shift lever 5 of the shift manipulation device 4 is manipulated to the non-drive range position at time t1, the shift range of the transmission 9 is shifted to the non-drive range at time t2. The shift range signal is switched over from the state indicating the drive range to the state indicating the non-drive range.

Then, when the door switch 7 is manipulated to turn on (door opening manipulation) at time t3, the shift lock request signal is turned on at time t4 and the door is opened at time t4. Then, when the door switch 7 is manipulated to turn off (door closing operation) at time t6, the shift lock request signal is turned off at time t7 and the door is closed at time t8. Then, when the shift lever 5 of the shift manipulation device 4 is manipulated to the drive range position at time t9, the shift range of the transmission 9 is shifted to the drive range at time t10. The shift range signal is switched over from the state indicating the non-drive range to the state indicating the drive range.

According to the comparative embodiment described above, the shift range of the transmission 9 can be prohibited from being shifted to the drive range in the transmission 9 of the shift-by-wire type under a state that the door is controlled to be open. As a result, it is possible to realize the same function as the function of mechanically fixing the shift lever in the transmission 9 of the mechanical type.

However, the shift lever is not mechanically fixed. For this reason, when the user turns on the door switch 7 and manipulates the shift lever 5 of the shift manipulation device 4 to move to the drive range position at about the same time, the shift range of the transmission 9 is likely to become the drive range under the state that the door is still open because of signal delay and the like. A sequence chart and a timing chart under this situation are shown in FIG. 9 and FIG. 10.

Figure 9:
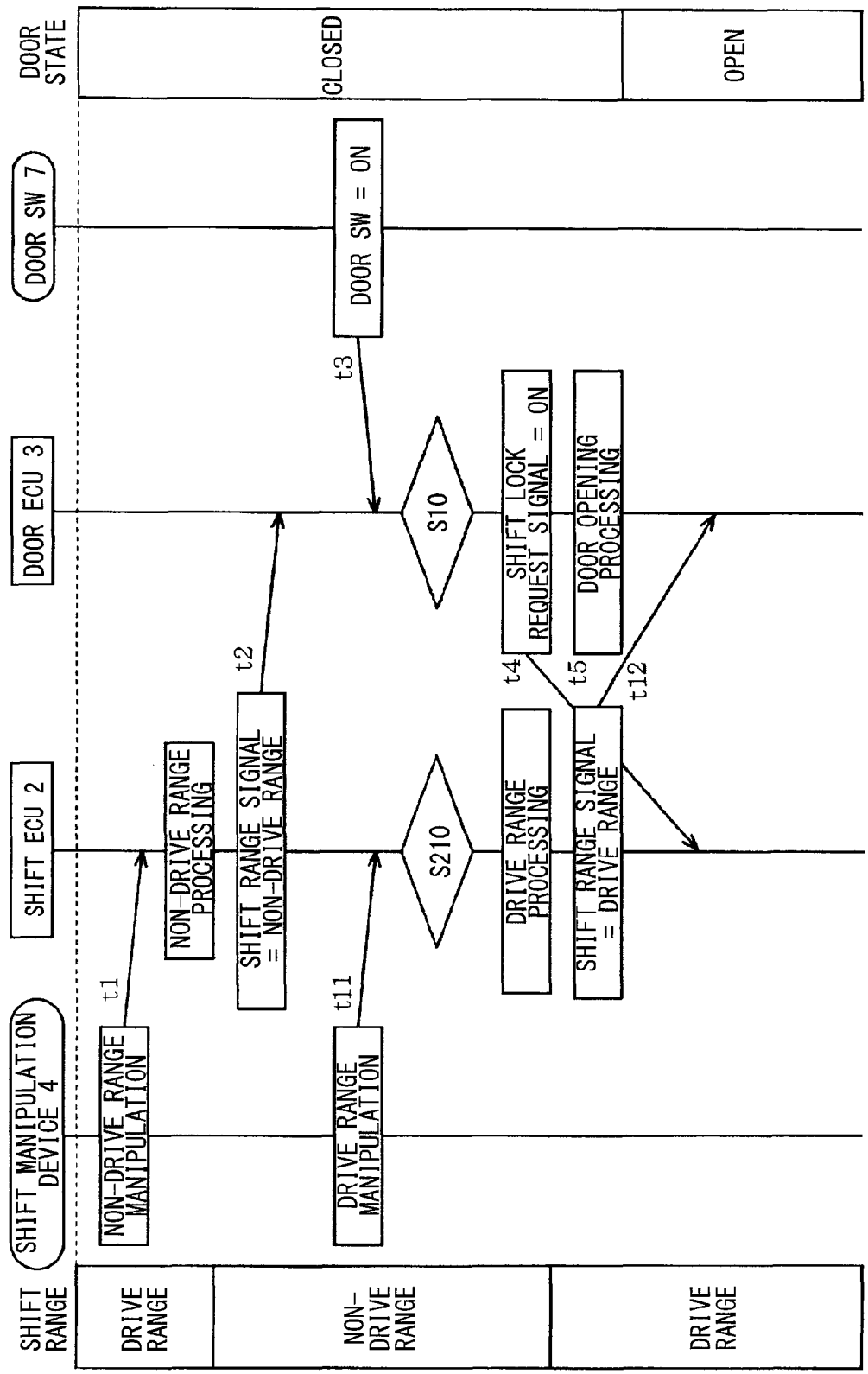
FIG. 9 is a sequence chart corresponding to FIG. 7 and showing an abnormality case in the comparative embodiment.
Figure 10:
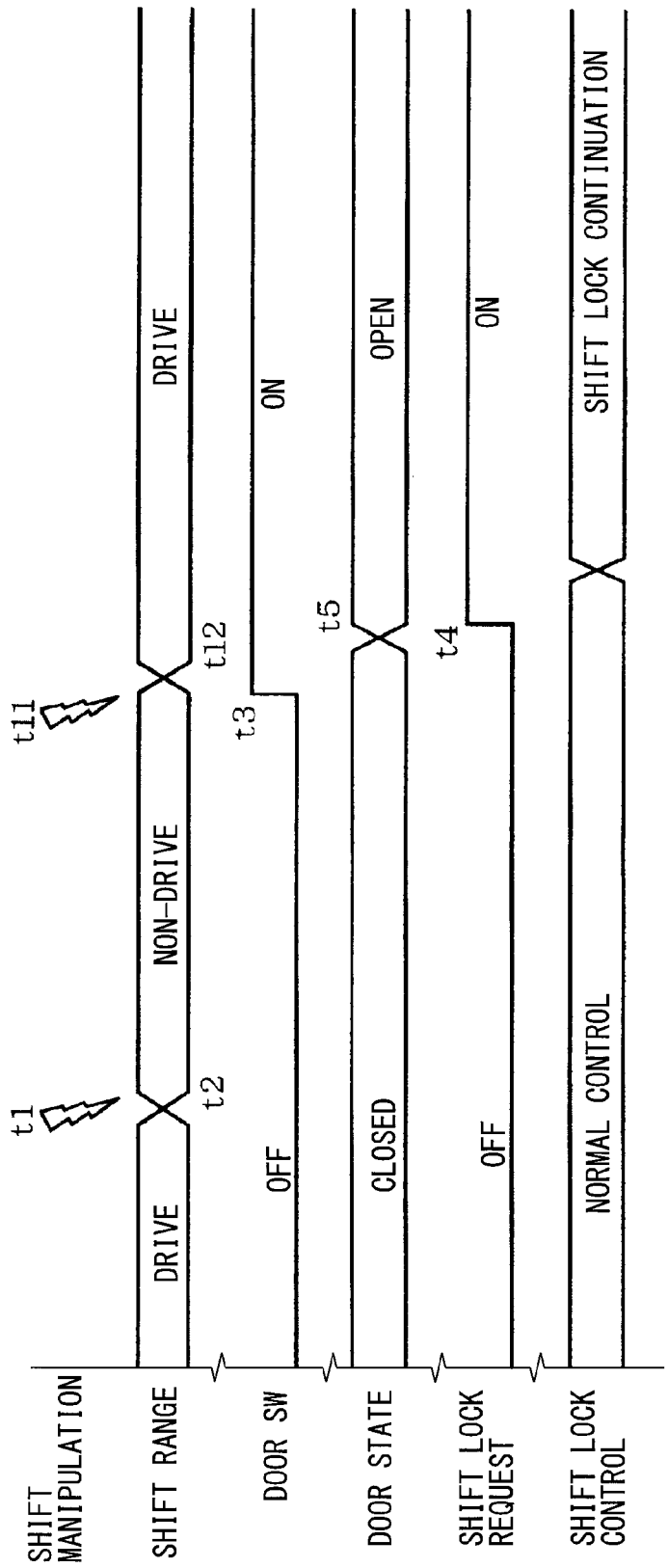
FIG. 10 is a time chart corresponding to FIG. 8 and showing an abnormality case in the comparative embodiment.

As shown in FIG. 9 and FIG. 10, when the door switch 7 is manipulated to turn on at time t3 under a state that the shift range is the non-drive range and the door is closed, the shift lock request signal is turned on at time t4 and the door is opened at time t5. When the shift lever 5 of the shift manipulation device 4 is manipulated to the drive range position at time t11 almost simultaneously as the door switch 7 is manipulated to turn on, the shift range of the transmission 9 is shifted to the drive range at time t12 and the shift range signal is switched over from the state indicating the non-drive range to the state indicating the drive range. In this case, before the shift range signal is changed to indicate the drive range at time t12, the door ECU 3 executes the checking of step S10. Since the door SW is ON and the shift range signal indicates the non-drive range, the door is opened. Further, before the shift lock request signal is turned on at time t4, the shift ECU 2 executes the checking of step S210. Since the shift lock request is OFF and the shift range signal indicates the drive range, the shift range of the transmission 9 is shifted to the drive range. For this reason, it may happen that the shift range of the transmission 9 becomes the drive range under a state that the door is open.

First Embodiment

A first embodiment solves the above-described disadvantage. The first embodiment will be described below with reference to FIG. 11 to FIG. 13, which show differences from the comparative embodiment described above with reference to FIG. 1 to FIG. 10. The same structural parts as the comparative embodiment are designated with the same reference numerals.

According to the first embodiment, the door ECU 3 is configured not to execute the processing of opening the door immediately after the door switch 7 is manipulated to turn on (door opening manipulation). That is, the door ECU 3 is configured to execute the processing of opening the door after a delay of a predetermined time period by setting the time delay from the time of turning on of the door switch 7.

Figure 11:
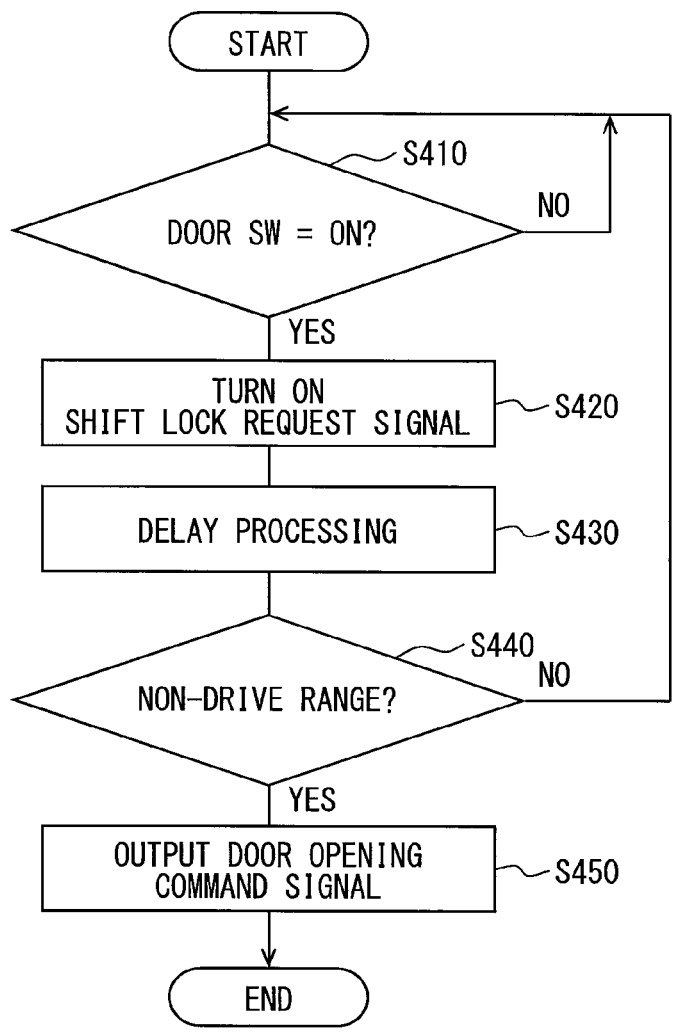
FIG. 11 is a flowchart showing a first embodiment in correspondence to FIG. 3.

A flowchart of FIG. 11 of the first embodiment shows control, which is executed in place of the flowchart of FIG. 3 of the comparative embodiment. It shows details of door opening control of the door ECU 3. This door opening control will be described in detail below.

First, at step S410 of FIG. 11, it is checked whether the door switch 7 is manipulated to open the door, that is, the door signal (door SW) is ON. When the door signal is OFF, step S410 outputs NO and repeats the same checking described above.

When the door signal is ON, step S410 outputs YES and executes step S420 to turn on the shift lock request signal. Then, at step S430, the delay processing is executed. The delay time period (predetermined time period) of the delay processing is set to be slightly longer with a certain margin than a time period, which is required for the shift ECU 2 to recognize the shift lock state from when the shift lock request signal is turned on to when the shift lock request signal of ON is transmitted to the shift ECU 2. Since a time period of communication between the shift ECU 2 and the door ECU 3 and time periods of various control processing of the shift ECU 2 and the door ECU 3 can be calculated accurately as design values, the predetermined time period can be set accurately as a necessary minimum time period for the delay. The time period for the delay may be between tens of microseconds to hundreds of microseconds, for example, about 100 microseconds.

Then, at step S440, it is checked whether the shift range of the transmission 9 is the non-drive range. When the shift range is not the non-drive range, step S410 outputs NO and repeats steps S410 to S440.

When the shift range of the transmission 9 is the non-drive range, step S440 outputs YES and the door ECU 3 executes step S450 to execute the door opening processing. That is, the door ECU 3 outputs the door opening command signal to the door opening/closing device 8 and opens the door.

Figure 12:
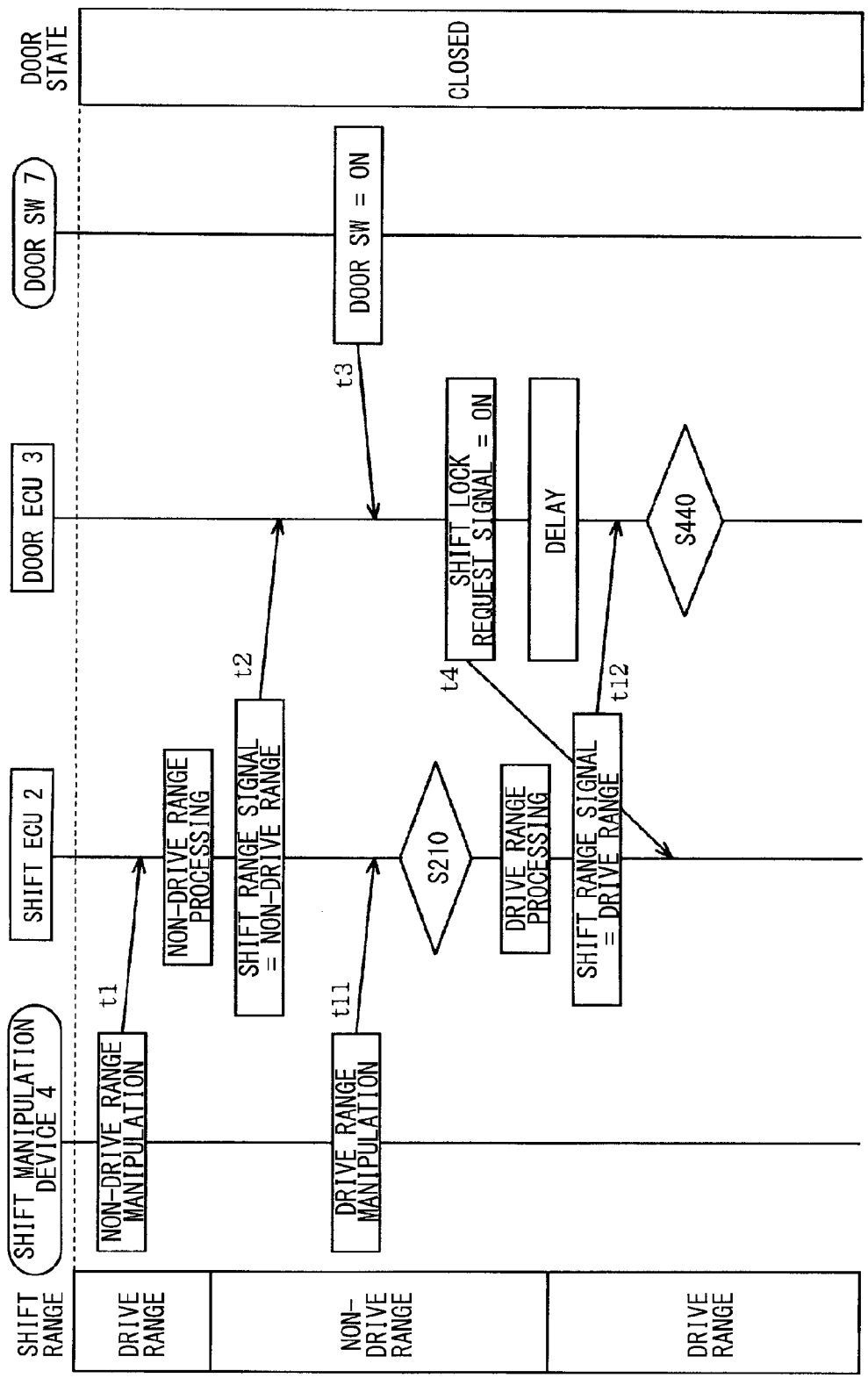
FIG. 12 is a sequence chart showing the first embodiment in correspondence to FIG. 9.
Figure 13:
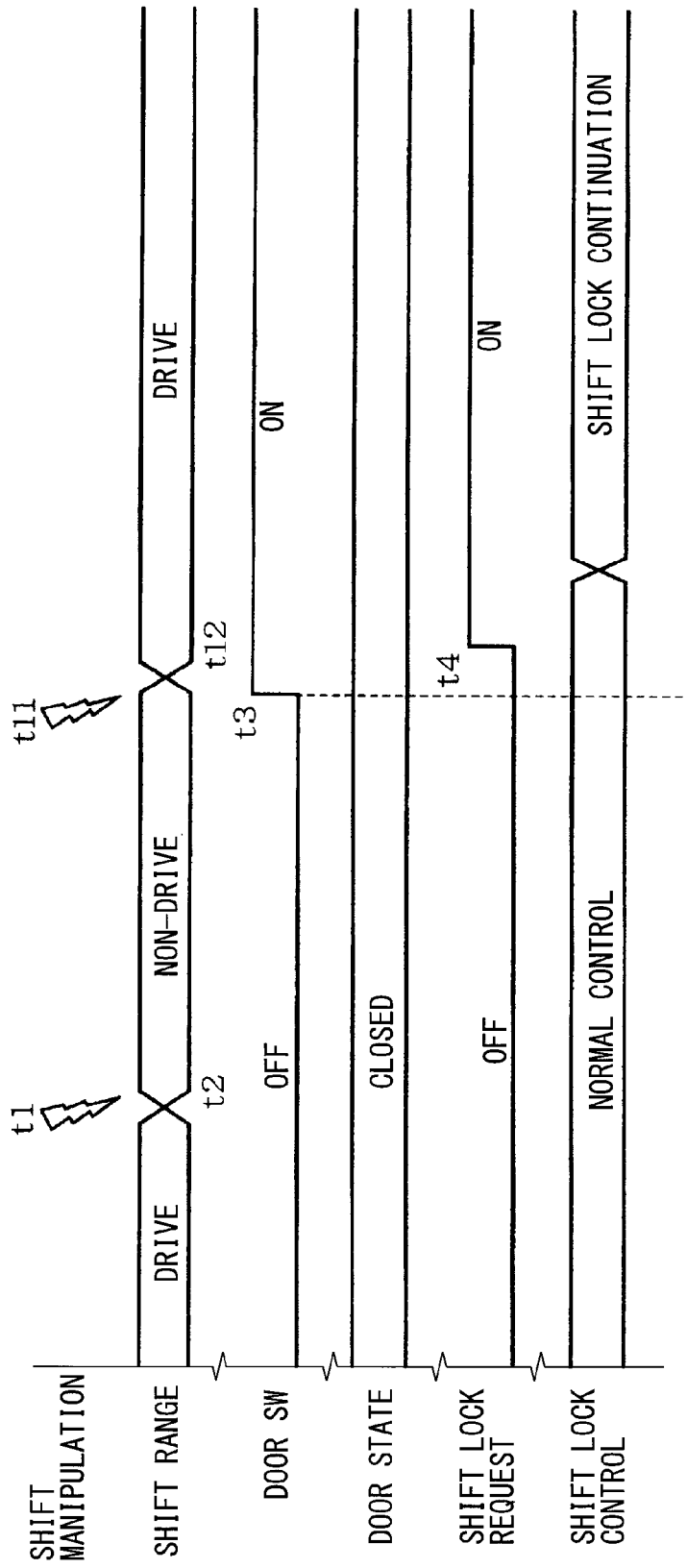
FIG. 13 is a time chart showing the first embodiment in correspondence to FIG. 10.

FIG. 12 and FIG. 13 show a sequence chart and a time chart, respectively, in a case that the user manipulates the door switch 7 to turn on and operates the shift lever 5 of the shift manipulation device 4 to move to the drive range position at almost the same time in the first embodiment described above.

When the door switch 7 is manipulated to turn on at time t3 under the state that the shift range of the transmission 9 is the non-drive range and the door is in the closed state as shown in FIG. 12 and FIG. 13, the shift lock request signal is turned on at time t4 and the delay processing (processing of measuring the predetermined time period) is executed. When the shift lever 5 of the shift manipulation device 4 is manipulated to the drive range position at time t11, which is almost the same time t3 as the door switch 7 is manipulated to turn on, the shift range of the transmission 9 is shifted to the drive range at time t12 and the shift range signal is switched over from the state indicating the non-drive range to the state indicating the drive range.

Then, when the delay processing is finished, the door ECU 3 executes the checking of step S440, which checks whether the shift range of the transmission 9 is the non-drive range. Since the shift range of the transmission 9 (shift range signal) is the drive range, the door is not open and remains closed. As a result, according to the first embodiment, the shift range of the transmission 9 is prevented surely from being changed to the drive range with the door still remaining open.

In the first embodiment described above, the door ECU 3 is configured preferably to turn off the door signal and the shift lock request signal when the door opening processing is not executed even after elapse of the predetermined time period from the turn-on of the door signal and the shift lock request signal.

Second Embodiment

FIG. 14 to FIG. 19 show a second embodiment. Same structural parts as the comparative embodiment and the first embodiment are designated with the same reference numerals. In the second embodiment, when the shift ECU 2 is performing the shift lock operation, the shift ECU 2 transmits a shift lock continuation signal, which indicates that the shift lock is being continued, to the door ECU 3.

Figure 14:
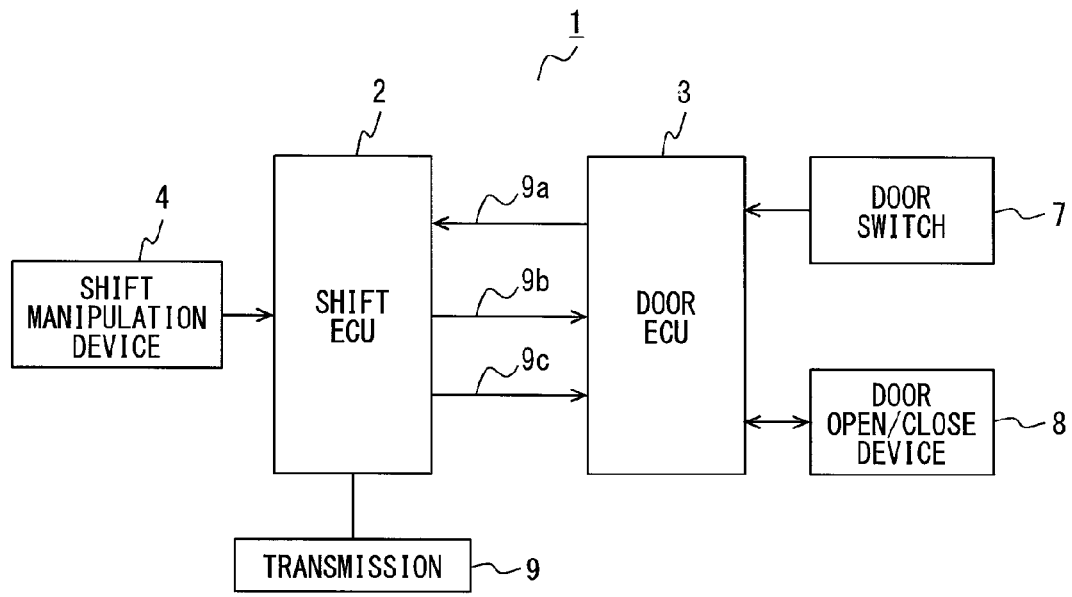
FIG. 14 is a block diagram showing a second embodiment in correspondence to FIG. 1.

Specifically, as shown in FIG. 14, the shift ECU 2 and the door ECU 3 are connected to each other through three connection lines 9a, 9b and 9c. The shift lock request signal is transmitted from the door ECU 3 to the shift ECU 2 through the first connection line 9a. The shift range signal is transmitted from the shift ECU 2 to the door ECU 3 through the second connection line 9b. The shift lock continuation signal is transmitted from the shift ECU 2 to the door ECU 3 through the third connection line 9c. When the shift lock is being continued, the shift ECU 2 turns on the shift lock continuation signal and transmits to the door ECU 3 the shift lock continuation signal, which is turned on to indicate the continuation of the shift lock. When the shift lock is not being continued, the shift ECU 2 turns off the shift lock signal and transmits to the door ECU 3 the shift lock signal, which is turned off to indicate no continuation of the shift lock.

Figure 15:
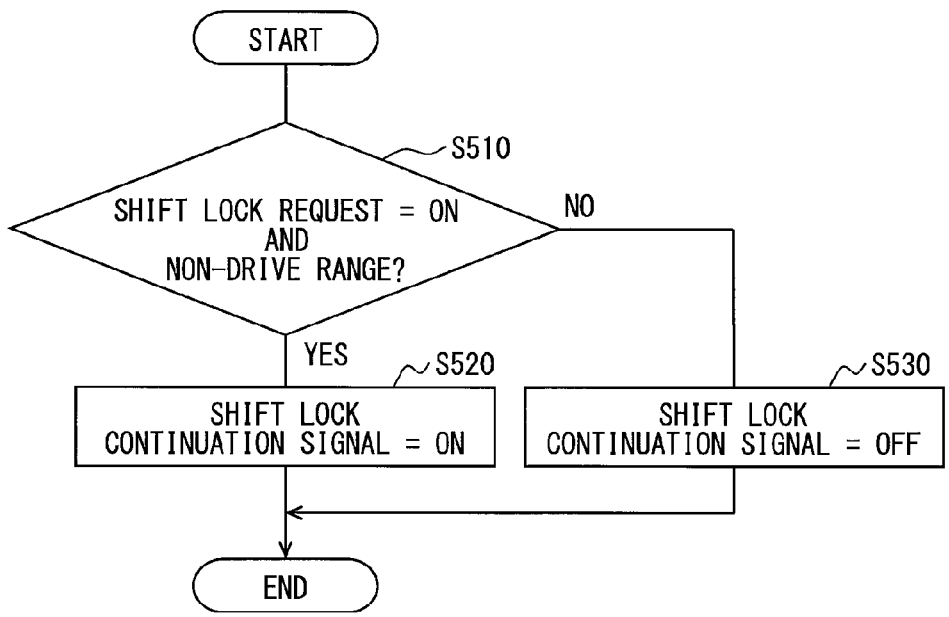
FIG. 15 is a flowchart showing signal setting control during a shift lock operation in the second embodiment.

The flowchart of FIG. 15 of the second embodiment shows additional control, which the shift ECU 2 is configured to perform newly, that is, details of control for turning on or off the shift lock continuation signal.

First, at step S510 of FIG. 15, it is checked whether the shift lock request signal is ON and the shift range of the transmission 9 is the non-drive range (N range or the like). When the shift lock request signal is ON and the shift range of the transmission 9 is the non-drive range, step S510 outputs YES and step S520 is executed. At step S520, the shift lock continuation signal is turned on. When the shift lock signal is OFF or the shift range of the transmission 9 is the drive range (D range or the like), step S510 outputs NO and step 530 is executed. At step S530, the shift lock continuation signal is turned off.

Figure 16:
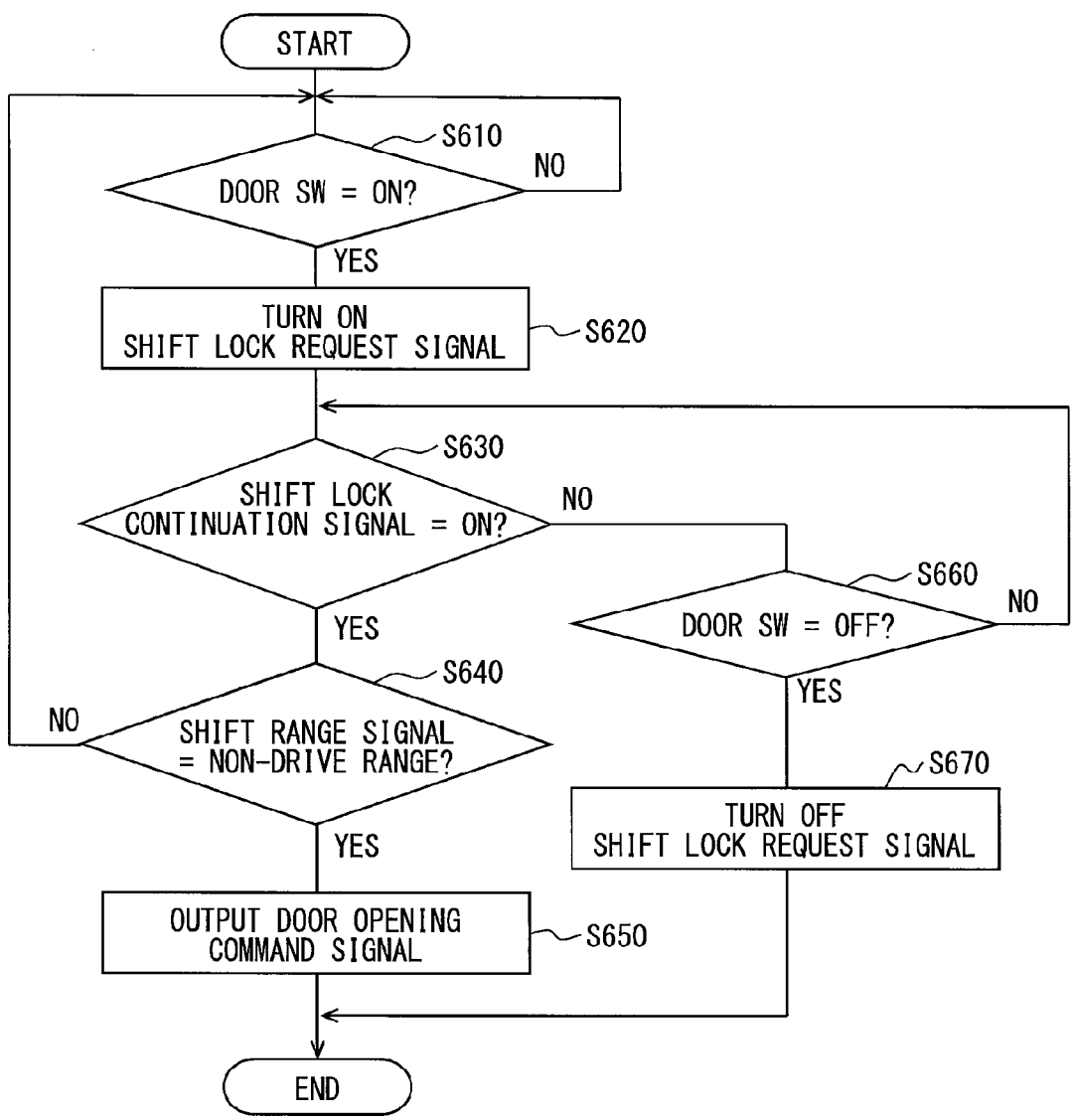
FIG. 16 is a flowchart showing the second embodiment in correspondence to FIG. 11.

A flowchart of FIG. 16 of the second embodiment shows control, which is executed in place of the flowchart of FIG. 11 of the first embodiment. It shows details of door opening control of the door ECU 3. This door opening control will be described in detail below.

First, at step S610 of FIG. 16, it is checked whether the door signal (door SW) is ON. When the door signal is OFF, step S610 outputs NO and repeats the same checking.

When the door signal is ON, step S610 outputs YES. At step S610, the shift lock request signal is turned on. Then, at step 630, it is checked whether the shift lock continuation signal from the shift ECU 2 is ON. When the shift lock continuation signal is ON, step 630 outputs YES. Then, at step S640, it is checked whether the shift range of the transmission 9 (shift range signal) is the non-drive range. When the shift range is not the non-drive range, step 640 outputs NO so that step S610 is executed.

When the shift range of the transmission 9 is the non-drive range, step S640 outputs YES. Then, at step S650, the door opening processing is executed. That is, the door ECU 3 outputs the door opening signal to the door opening/closing device 8 to open the door.

When the shift lock continuation signal is not ON, step S630 outputs NO. Then, at step S660, it is checked whether the door signal (door SW) is OFF. When the door signal is not OFF, step S660 outputs NO. Then, step S630 is executed. When the door signal is OFF, step S660 outputs YES. Then at step S670 the shift lock request signal is turned off.

Figure 17:
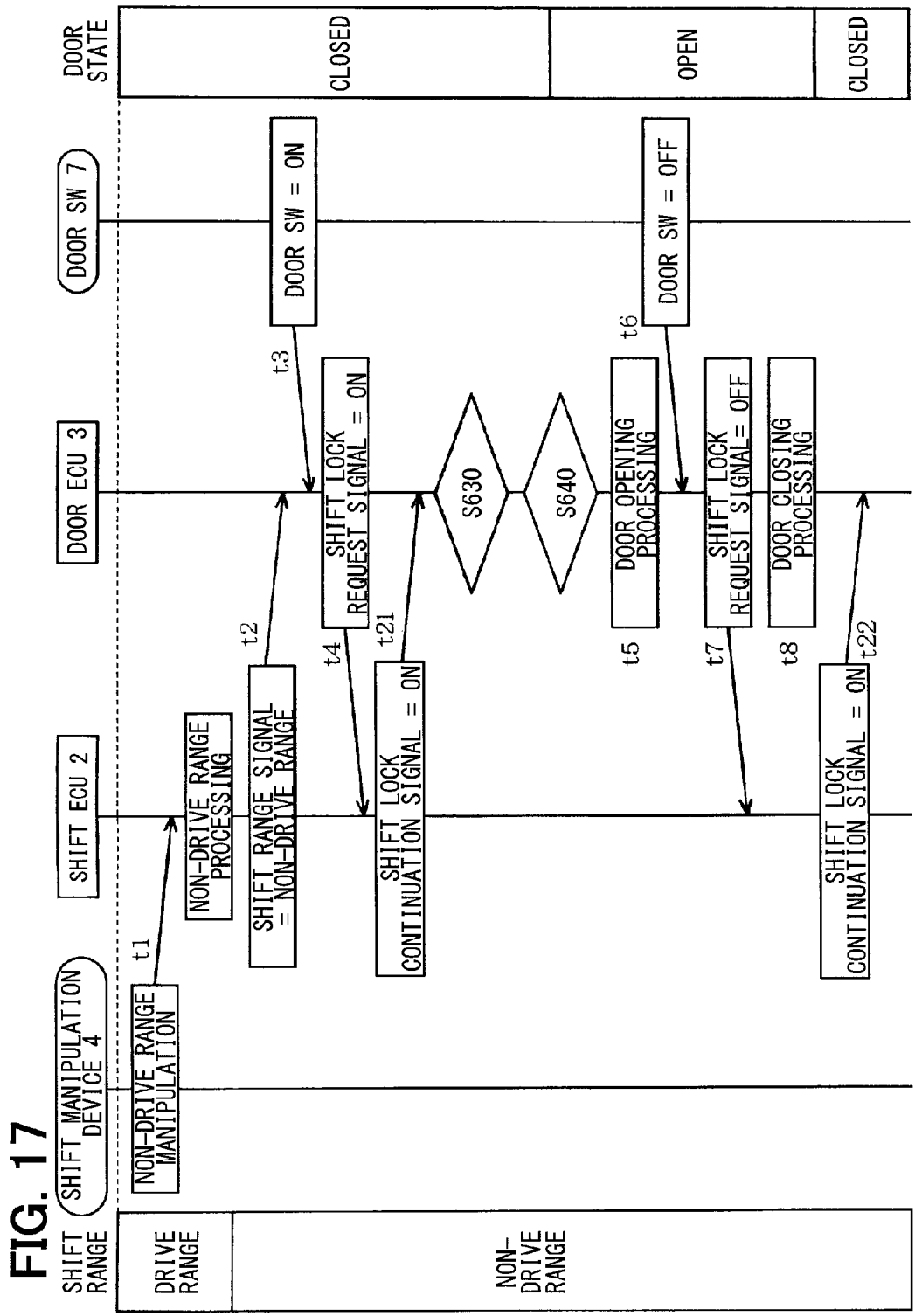
FIG. 17 is a sequence chart showing the second embodiment in correspondence to FIG. 7.
Figure 18:
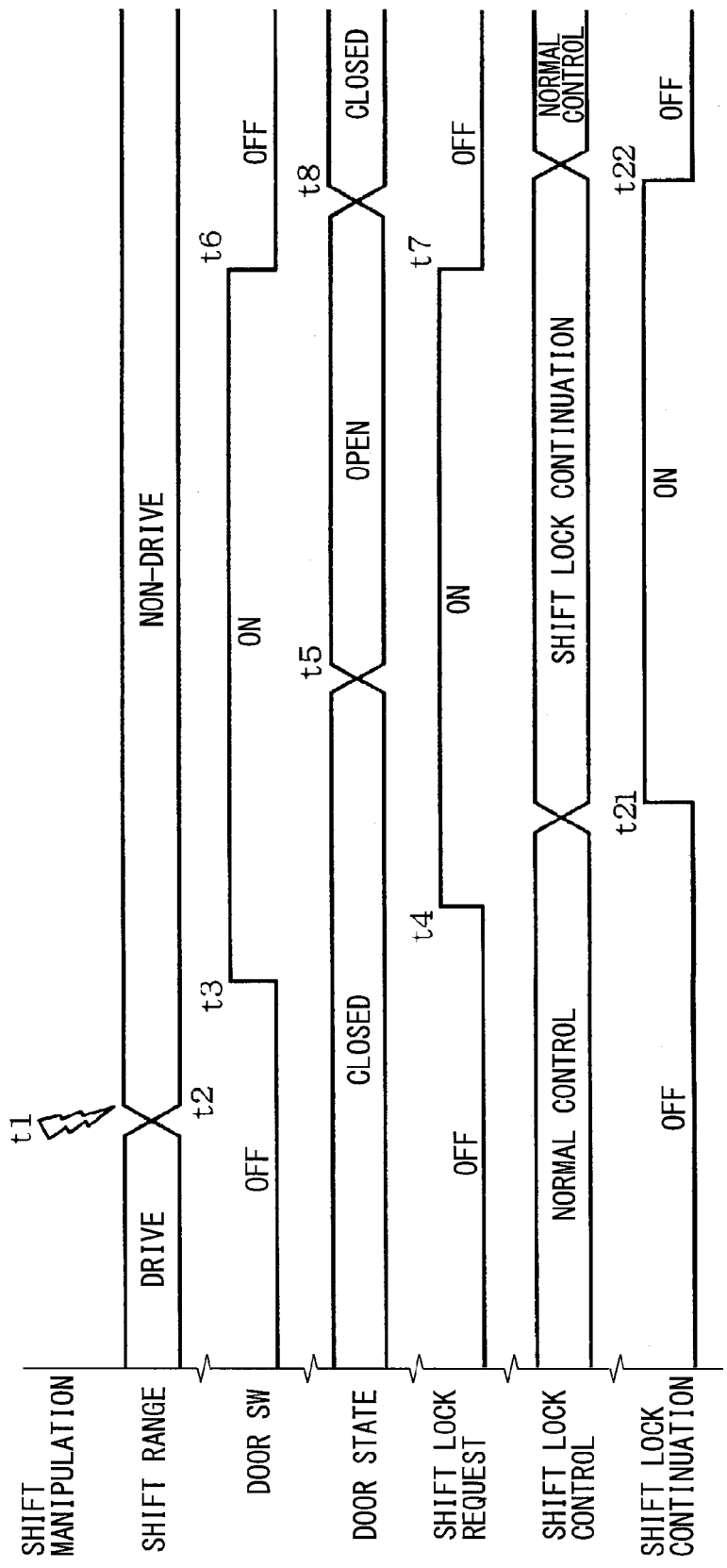
FIG. 18 is a time chart showing the second embodiment in correspondence to FIG. 8.

A series of control among the state of the shift range of the transmission 9, the operation of the shift manipulation device 4, the control of the shift ECU 2, the control of the door ECU 3, the manipulation of the door switch 7 and the opening/closing state of the door is shown in a sequence chart of FIG. 17 and a time chart of FIG. 18. As shown in FIG. 17 and FIG. 18, when the shift lever 5 of the shift manipulation device 4 is manipulated to the non-drive range position at time t1, the shift range of the transmission 9 is shifted to the non-drive range at time t2. The shift range signal is switched over from the state indicating the drive range to the state indicating the non-drive range.

Then, when the door switch 7 is manipulated to turn on at time t3, the shift lock request signal is turned on at time t4. The shift ECU 2 turns on the shift lock continuation signal at time t21 upon receiving the shift lock request signal, which is turned on. The door ECU 3 executes checking of step S630 and step S640 upon receiving the shift lock continuation signal, which is turned on. With outputs of steps S630 and S640 being YES, step S650 is executed and the door is opened at time t5.

Then, when the door switch 7 is manipulated to turn off at time t6, the shift lock request signal is turned off at time t7 and the door is closed at time t8. The shift ECU 2 turns off the shift lock continuation signal at time t22 upon receiving the shift lock request signal, which is turned off.

Figure 19:
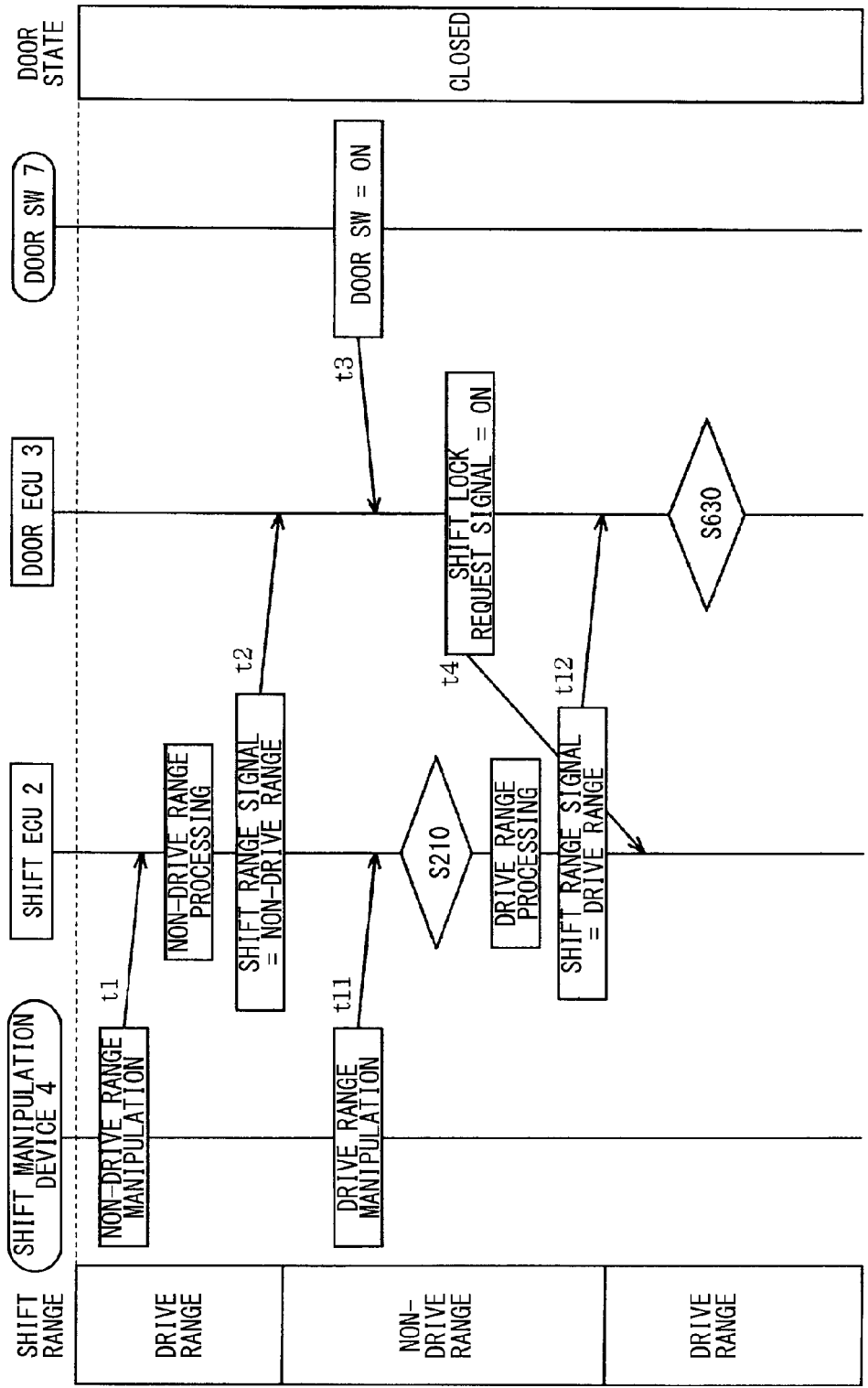
FIG. 19 is a sequence chart showing the second embodiment corresponding to FIG. 12.

FIG. 19 shows a sequence chart in a case that the user manipulates the door switch 7 to turn on and operates the shift lever 5 of the shift manipulation device 4 to move to the drive range position at almost the same time in the second embodiment described above.

When the door switch 7 is manipulated to turn on at time t3 under the state that the shift range is the non-drive range and the door is in the closed state as shown in FIG. 19, the shift lock request signal is turned on at time t4. When the shift lever 5 of the shift manipulation device 4 is manipulated to the drive range position at time t11, which is almost the same time t3 as the door switch 7 is manipulated to turn on, the shift range of the transmission 9 is shifted to the drive range at time t12 and the shift range signal is switched over from the state indicating the non-drive range to the state indicating the drive range. Even when the shift ECU 2 receives the shift lock request signal, which is turned on, under this condition, the shift ECU 2 does not perform the shift lock because the present shift range of the transmission 9 is the drive range. That is, the shift ECU 2 is configured to maintain the shift lock continuation signal to be OFF.

For this reason, the door ECU 3 executes the checking of step S630. Since the shift range of the transmission 9 (shift range signal) is the drive range, the door is not opened and remains closed. As a result, according to the second embodiment, the shift range of the transmission 9 is prevented surely from changing to the drive range with the door remaining open.

In each of the embodiments described above, the shift ECU 2 and the door ECU 3 are connected to each other through the connection lines so that the shift ECU 2 and the door ECU 3 communicate each other through the connection lines. However, the shift ECU 2 and the door ECU 3 may alternatively be connected to each other through an in-vehicle LAN so that the shift ECU 2 and the door ECU 3 may communicate each other through the in-vehicle LAN.

What is claimed is:

1. A door control system with transmission shift range control comprising a shift range control apparatus for controlling a transmission of a shift-by-wire type, and a door control apparatus for controlling opening/closing of a door of a vehicle, wherein the shift range control apparatus includes:
a drive range control part for shifting a shift range of the transmission to a drive range and setting a shift range signal to indicate the drive range, when a manipulation for shifting the shift range of the transmission to the drive range is performed under a state that no shift lock request is outputted from the door control apparatus;
a non-drive range control part for shifting the shift range of the transmission to a non-drive range and setting the shift range signal to indicate the non-drive range, when a manipulation for shifting the shift range of the transmission to the non-drive range is performed; and
a signal output part for outputting the shift range signal to the door control apparatus, and wherein the door control apparatus includes:
a door opening part for outputting a shift lock request to the shift range control apparatus when a door switch is manipulated to open, checking whether the shift range signal from the shift range control apparatus indicates the non-drive range after a delay in time from initiation of output of the shift lock request, and opening the door when the shift range signal indicates the non-drive range, and the delay in time is longer than an amount of time necessary to transmit the shift lock request from the door control apparatus to the shift range control apparatus; and
a door closing part closes the door without outputting the shift lock request to the speed-change apparatus when the door switch is manipulated to close the door.

2. A door control system with transmission shift range control comprising a shift range control apparatus for controlling a transmission of a shift-by-wire type, and a door control apparatus for controlling opening/closing of a door of a vehicle, wherein the shift range control apparatus includes:
a drive range control part for shifting a shift range of the transmission to a drive range and setting a shift range signal to indicate the drive range, when a manipulation for shifting the shift range of the transmission to the drive range is performed under a state that no shift lock request is outputted from the door control apparatus;
a non-drive range control part for shifting the shift range of the transmission to a non-drive range and setting the shift range signal to indicate the non-drive range, when a manipulation for shifting the shift range of the transmission to the non-drive range is performed; and
a signal output part for outputting the shift range signal to the door control apparatus, and wherein the door control apparatus includes:
a door opening part for outputting a shift lock request to the shift range control apparatus when a door switch is manipulated to open, checking whether the shift range signal from the shift range control apparatus indicates the non-drive range after a time delay from initiation of output of the shift lock request, and opening the door when the shift range signal indicates the non-drive range;
a door closing part closes the door without outputting the shift lock request to the speed-change apparatus when the door switch is manipulated to close the door, and
the time delay is set to an amount of time longer than an amount of time required for the shift range control apparatus to recognize the shift lock state from when the shift lock request is initially turned on by the door control apparatus and until transmitted to the shift range control apparatus.

3. A door control system with transmission shift range control comprising a shift range control apparatus for controlling a transmission of a shift-by-wire type, and a door control apparatus for controlling opening/closing of a door of a vehicle, wherein the shift range control apparatus includes:
a drive range control part for shifting a shift range of the transmission to a drive range and setting a shift range signal to indicate the drive range, when a manipulation for shifting the shift range of the transmission to the drive range is performed under a state that no shift lock request is outputted from the door control apparatus;
a non-drive range control part for shifting the shift range of the transmission to a non-drive range and setting the shift range signal to indicate the non-drive range, when a manipulation for shifting the shift range of the transmission to the non-drive range is performed; and
a signal output part for outputting the shift range signal to the door control apparatus, and wherein the door control apparatus includes:
a door opening part for outputting a shift lock request to the shift range control apparatus when a door switch is manipulated to open, checking whether the shift range signal from the shift range control apparatus indicates the non-drive range after a delay from time of output of the shift lock request, and opening the door when the shift range signal indicates the non-drive range;

a door closing part closes the door without outputting the shift lock request to the speed-change apparatus when the door switch is manipulated to close the door, and the delay is a predetermined time period from the output of the shift lock request, the time period continuing until the shift range control apparatus outputs a response indicating that the shift lock request is received.

4. The door control system with transmission shift range control according to claim 3, wherein:

the drive range control part also outputs a shift lock continuation signal, when the manipulation for shifting the shift range of the transmission to the drive range is performed under the state that no shift lock request is outputted from the door control apparatus, and the door opening part continues the shift lock when the shift lock continuation signal is on and the shift range signal from the shift range control apparatus indicates the non-drive range.

5. The door control system with transmission shift range control according to claim 3, wherein:

the drive range control part also outputs a shift lock continuation signal, when the manipulation for shifting the shift range of the transmission to the drive range is performed under the state that no shift lock request is outputted from the door control apparatus, and the door opening part outputs the door opening command signal when the shift lock continuation signal is on and the shift range signal from the shift range control apparatus indicates the non-drive range.

* * * * *